United States Patent
Satou et al.

(10) Patent No.: US 8,482,821 B2
(45) Date of Patent: Jul. 9, 2013

(54) SENSOR DEVICE AND IMAGE-FORMING APPARATUS

(75) Inventors: Shin Satou, Saitama (JP); Hayato Geka, Noda (JP)

(73) Assignee: Fuji Xerox Co., Ltd., Tokyo (JP)

( * ) Notice: Subject to any disclaimer, the term of this patent is extended or adjusted under 35 U.S.C. 154(b) by 369 days.

(21) Appl. No.: 12/845,908

(22) Filed: Jul. 29, 2010

(65) Prior Publication Data

US 2011/0063694 A1    Mar. 17, 2011

(30) Foreign Application Priority Data

Sep. 15, 2009 (JP) ................................. 2009-212954

(51) Int. Cl.
| H04N 1/00 | (2006.01) |
| H04N 1/04 | (2006.01) |
| G03G 15/00 | (2006.01) |
| G03G 15/08 | (2006.01) |
| G03G 21/00 | (2006.01) |
| G03G 15/02 | (2006.01) |

(52) U.S. Cl.
USPC ............... 358/498; 358/406; 399/9; 399/71; 399/27; 399/116; 399/98

(58) Field of Classification Search
USPC ............... 358/498, 406; 399/9, 71, 27, 116, 399/98
See application file for complete search history.

(56) References Cited

U.S. PATENT DOCUMENTS

| 6,021,285 | A | * | 2/2000 | Mestha et al. ..................... 399/9 |
| 6,081,348 | A | * | 6/2000 | Budnik et al. ................. 358/406 |
| 2003/0016964 | A1 | * | 1/2003 | Terai ............................... 399/98 |
| 2003/0091368 | A1 | * | 5/2003 | Yamamoto et al. ........... 399/116 |
| 2005/0185973 | A1 | * | 8/2005 | Hama et al. ...................... 399/27 |
| 2008/0008489 | A1 | * | 1/2008 | Watanabe et al. ............... 399/71 |

FOREIGN PATENT DOCUMENTS

| JP | A-2000-39579 | 2/2000 |
| JP | A-2004-279671 | 10/2004 |
| JP | A-2006-215225 | 8/2006 |

* cited by examiner

*Primary Examiner* — Charlotte M Baker
*Assistant Examiner* — Rury Grisham
(74) *Attorney, Agent, or Firm* — Oliff & Berridge, PLC

(57) ABSTRACT

A sensor device includes: a member that has an aperture facing a target measuring position through which a target to be measured passes; a sensor that is provided in an opposing relation to the target measuring position, and that measures a physical quantity of the target at a sensor surface facing the aperture; and a moving member that reciprocates a movement in a predetermined direction, and includes: a cleaning unit that cleans the sensor surface by contacting the sensor surface while the moving member moves to at least one of an outward movement and a return reciprocal movement; an applying portion that applies to the moving member a force in one direction of the reciprocation movement; and a manipulation portion that is moved by an operator against the force applied by the applying portion in an direction opposite to that of a direction of the force.

10 Claims, 7 Drawing Sheets

SENSOR DEVICE AND IMAGE-FORMING APPARATUS

CROSS-REFERENCE TO RELATED APPLICATIONS

This application is based on and claims priority under 35 USC 119 from Japanese Patent Application No. 2009-212954 filed on Sep. 15, 2009.

BACKGROUND

1. Technical Field

The present invention relates to a sensor device and an image-forming apparatus.

2. Related Art

A sensor device for measuring a physical quantity is, for example, used in an image-forming apparatus as a toner density sensor or a registration sensor. Such a sensor device needs to be disposed at a position through which unfixed toner passes. By being disposed at such a position, the sensor device is prone to contamination with toner spray that adheres to the device.

SUMMARY

According to an aspect of the invention, there is provided a sensor device including: a member that has an aperture facing a target measuring position through which a target to be measured passes; a sensor that is provided in an opposing relation to the target measuring position, and that measures a physical quantity of the target at a sensor surface facing the aperture; and a moving member that reciprocates a movement in a predetermined direction, and includes: a cleaning unit that cleans the sensor surface by contacting the sensor surface while the moving member moves to at least one of an outward movement and a return reciprocal movement; an applying portion that applies to the moving member a force in one direction of the reciprocation movement; and a manipulation portion that is moved by an operator against the force applied by the applying portion in an direction opposite to that of a direction of the force.

BRIEF DESCRIPTION OF THE DRAWINGS

An exemplary embodiment of the present invention will now be described in detail based on the following figures, wherein.

DETAILED DESCRIPTION

1. Exemplary Embodiment

Figure 1:
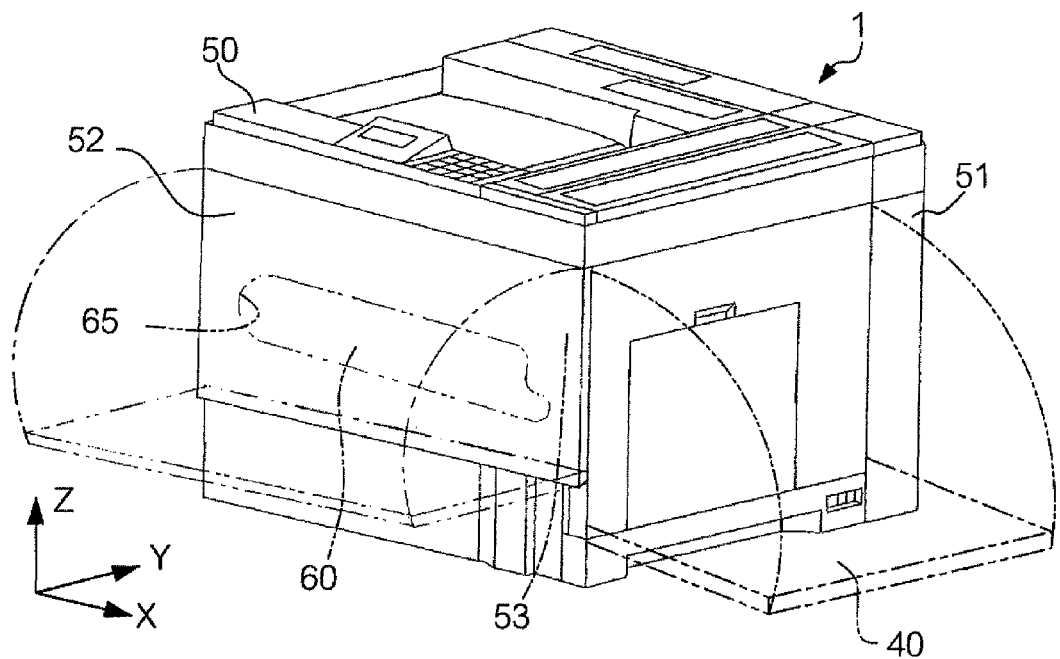
FIG. 1 shows a perspective view of an image-forming apparatus.
Figure 2:
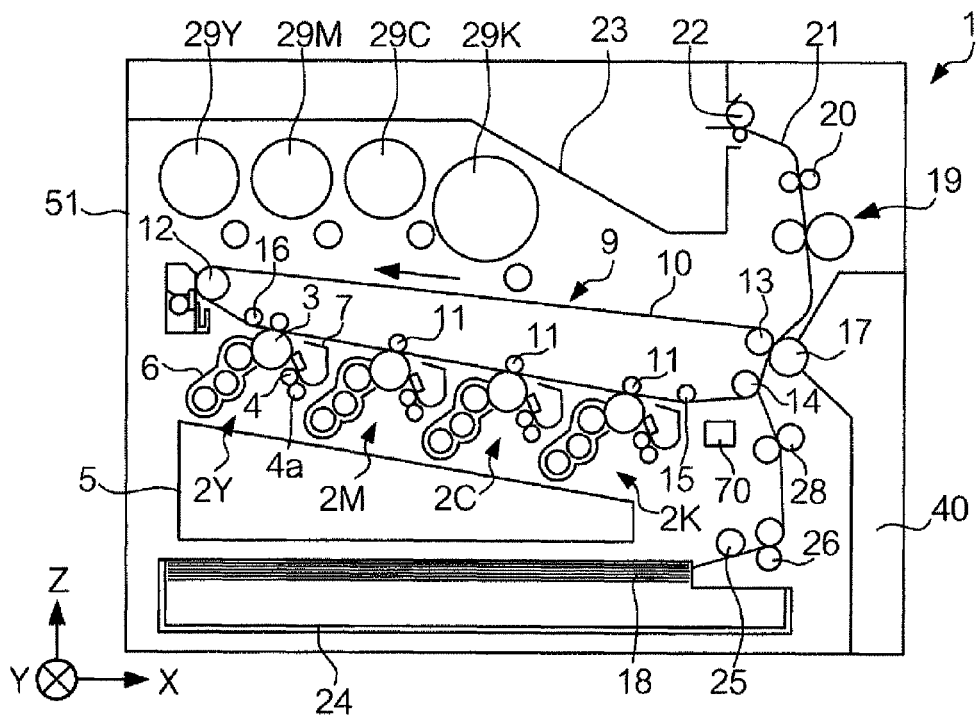
FIG. 2 shows a schematic view of the image-forming apparatus.

An image-forming apparatus such as a printer and a copy machine may include an openable cover provided at one or another side of a casing of the apparatus. Such a cover enables replacement or maintenance of a component or the like to be carried out, or, an operation to rectify in the apparatus a paper jam or the like to be carried out. In the exemplary embodiment, this type of image-forming apparatus is described as an example. FIG. 1 is a perspective view of an exterior of an image-forming apparatus, on which a casing is provided in accordance with the exemplary embodiment. FIG. 2 is a schematic view of a structure of a casing of the image-forming apparatus.

Configuration of Image-Forming Apparatus

As shown in FIG. 1, an exterior of image-forming apparatus 1 generally comprises a box-shaped device body 51. On the front of device body 51, exterior cover 52 is openably provided. When exterior cover 52 is opened, front frame 53 is exposed to the outside. On front frame 53, internal cover 60 is provided. Internal cover 60 is able to expose aperture 65 when open and to over the same when closed. On the right side of device body 51, side cover 40 is openably provided.

In the following description, right/left directions as viewed from the front of image-forming apparatus 1 is defined as X-axis, a depth direction is defined as Y-axis, and a height direction is defined as Z-axis.

Next, description is made of an example of an internal configuration and an operation of image-forming apparatus 1, with reference to FIG. 2. Image-forming apparatus 1 is a tandem type full color printer. Image-forming apparatus 1 has an image-processing device (not shown) inside. The image-processing device performs image processing of image data, which is provided from a scanner, a personal computer, a telephone line, and so on (not shown). Image-forming apparatus 1 also has four image-forming units 2Y, 2M, 2C, and 2K for respective yellow (Y), magenta (M), Cyan (C), and black (K) inside. Image-forming units 2Y, 2M, 2C, and 2K are arranged in parallel and inclined with respect to a horizontal direction at an angle of a certain degree (for example, 10 degrees), maintaining a gap between each other. In this arrangement, image-forming unit 2Y for the first color of yellow (y) is located at a relatively higher position, and image-forming unit 2K for the last color of black (K) is located at a relatively lower position. Due to the arrangement of four image-forming units 2Y, 2M, 2C, and 2K inclined at an angle of a certain degree, a length of image-forming units 2Y, 2M, 2C, and 2K becomes shorter in a widthwise direction, as compared with a case where image-forming units 2Y, 2M, 2C, and 2K are arranged horizontally.

Each of four image-forming units 2Y, 2M, 2C, and 2K basically has the same configuration. Specifically, each of image-forming units 2Y, 2M, 2C, and 2K includes: photosensitive drum 3 serving as an image holder that is rotary driven at a certain speed by a drive unit (not shown); charging roller 4 that is used for primary charging in which the surface of photosensitive drum 3 is charged; developing device 6 that develops by application of a toner a latent image formed on photosensitive drum 3 by an image exposure of image exposure device 5 described below; and cleaning device 7 that cleans the surface of photosensitive drum 3. Photosensitive drum 3 is, for example, an organic photoreceptor that is generally in the form of a drum and has a diameter of approximately 30 mm and is provided on its outer surface with an overcoat layer. Photosensitive drum 3 is rotary driven by a drive motor (not shown). Charging roller 4 is a roll type charging device that has a cored bar and a conduction layer covering the surface of the cored bar. The conduction layer is made of a synthetic resin or rubber, and has an adjusted electric resistance. A charging bias is applied to the cored bar of charging roller 4. On the surface of charging roller 4, cleaning roller 4a is disposed while contacting, to remove a foreign substance such as a toner adhering to the surface of charging roller 4.

In the following description, in which no particular distinction is made between image-forming units 2Y, 2M, 2C, and 2K, the units are collectively referred to as "image-forming unit 2."

Image exposure device 5 is provided below image-forming units 2Y, 2M, 2C, and 2K. Image exposure device 5 has four laser diodes (not shown) that emit laser beams modulated on the basis of image data. Four laser beams emitted from those diodes are deflected by polygon mirrors, pass through lens and mirrors (not shown), and reach each surface of photosensitive drums 3 of image-forming units 2Y, 2M, 2C, and 2K during a scanning operation.

In this exemplary embodiment, image exposure device 5 is disposed along an under side of four image-forming units 2Y, 2M, 2C, and 2K that are arranged such that they are inclined with respect to a horizontal direction. Thus, a length of an optical path of each laser beam exposing the surface of each photosensitive drum 3 in image-forming units 2Y, 2M, 2C, and 2K is identical.

The image-processing device sequentially outputs image data of each color to image exposure device 5 that is commonly provided to image-forming units 2Y, 2M, 2C, and 2K. Each of laser beams emitted from image exposure device 5 on the basis of image data reaches the surface of corresponding photosensitive drum 3 during a scanning operation to form a latent image on photosensitive drums 3. Latent images formed on photosensitive drums 3 are respectively developed by developing devices 6Y, 6M, 6C, and 6K, and toner images of colors present on photosensitive drums 3. Toner images of colors sequentially formed on photosensitive drums 3 of image-forming units 2Y, 2M, 2C, and 2K are plurality transferred by primary transfer rollers 11 on intermediate transfer belt 10, respectively. Intermediate transfer belt 10 serves as an intermediate transfer member, and is disposed such that it is inclined along an upper side of image forming units 2Y, 2M, 2C, and 2K.

Intermediate transfer belt 10 is a belt member and tensioning of the belt is achieves by use of plural rollers. An under driving area of the belt member is inclined with respect to a direction of horizontal such that: the downstream side along the driving direction is located at a lower position; and the upstream side is located at a higher position. Specifically, a tension of intermediate transfer belt 10 is maintained by use of each of tensioning roller 12, drive roller 13, backup roller 14, first idler roller 15, second idler roller 16, and is cyclically driven in a direction of the arrow by drive roller 13. Drive roller 13 is rotary driven by a dedicated drive motor (not shown), movement of which is optimized at a preset speed. Intermediate belt 10 is made of a flexible synthetic resin film such as polyimide, which is, for example, formed into a belt by connecting both ends of the synthetic resin film using welding or other means. Intermediate transfer belt 10 is disposed such that the under driving area contacts photosensitive drums 3Y, 3M, 3C, and 3K of image-forming units 2Y, 2M, 2C, and 2K.

In addition, intermediate transfer belt 10, primary transfer rollers 11, tensioning roller 12, drive roller 13, backup roller 14, first idler roller 15, and second idler roller 16 compose one unit, which is referred to as intermediate transfer unit 9.

On the opposite side of drive roller 13 via intermediate transfer belt 10, secondary transfer roller 17 is disposed so as to contact the surface of intermediate transfer belt 10 with pressure. Secondary transfer roller 17 performs secondary transfers on recording medium 18 a toner image where a primary transfer on intermediate transfer belt 10 is performed. A toner image of yellow (Y), magenta (M), cyan (C), and black (K) is plurally transferred onto intermediate transfer belt 10, a secondary transfer is performed on recording medium 18 by secondary transfer roller 17 and welding drive roller 13 with pressure exerted by a pressure welding force and an electrostatic force. Recording medium 18, on which toner image of multiple colors is transferred, is transported to fixing device 19 located above secondary transfer roller 17.

Then, on recording medium 18, on which a toner image of plural colors is transferred, a fixing process is carried out by way of fixing device 19, with heat and pressure being applied to recording medium 18, which passes through exit roller 20 of fixing device 19 and sheet output pass 21, and is output by output roller 22 on sheet receive unit 23 that is provided at the top of image-forming apparatus 1.

Image-forming apparatus 1 has sheet storage 24 that stores recording mediums 18 having a determined size and material inside. Recording mediums 18 are separated individually by way of feed roller 25 and a pair of roller 26 for separating and transporting a medium, which is transported to registration roller 28 and caused to stop there temporarily. Recording medium 18 fed from sheet storage 24 is transported to a secondary transfer position on intermediate transfer belt 10 by registration roller 28, which is rotary driven at a predetermined timing.

Toner cartridges 29Y, 29M, 29C, and 29K are provided between sheet receive unit 23 and intermediate transfer belt 10. Toner cartridges 29Y, 29M, 29C, and 29K respectively provide toners to developing devices 6Y, 6M, 6C, and 6K. Since toner cartridge 29K containing a black toner tends to be used relatively frequently, a size of toner cartridge 29K is larger than of cartridges used for toners of other colors.

Figure 3:
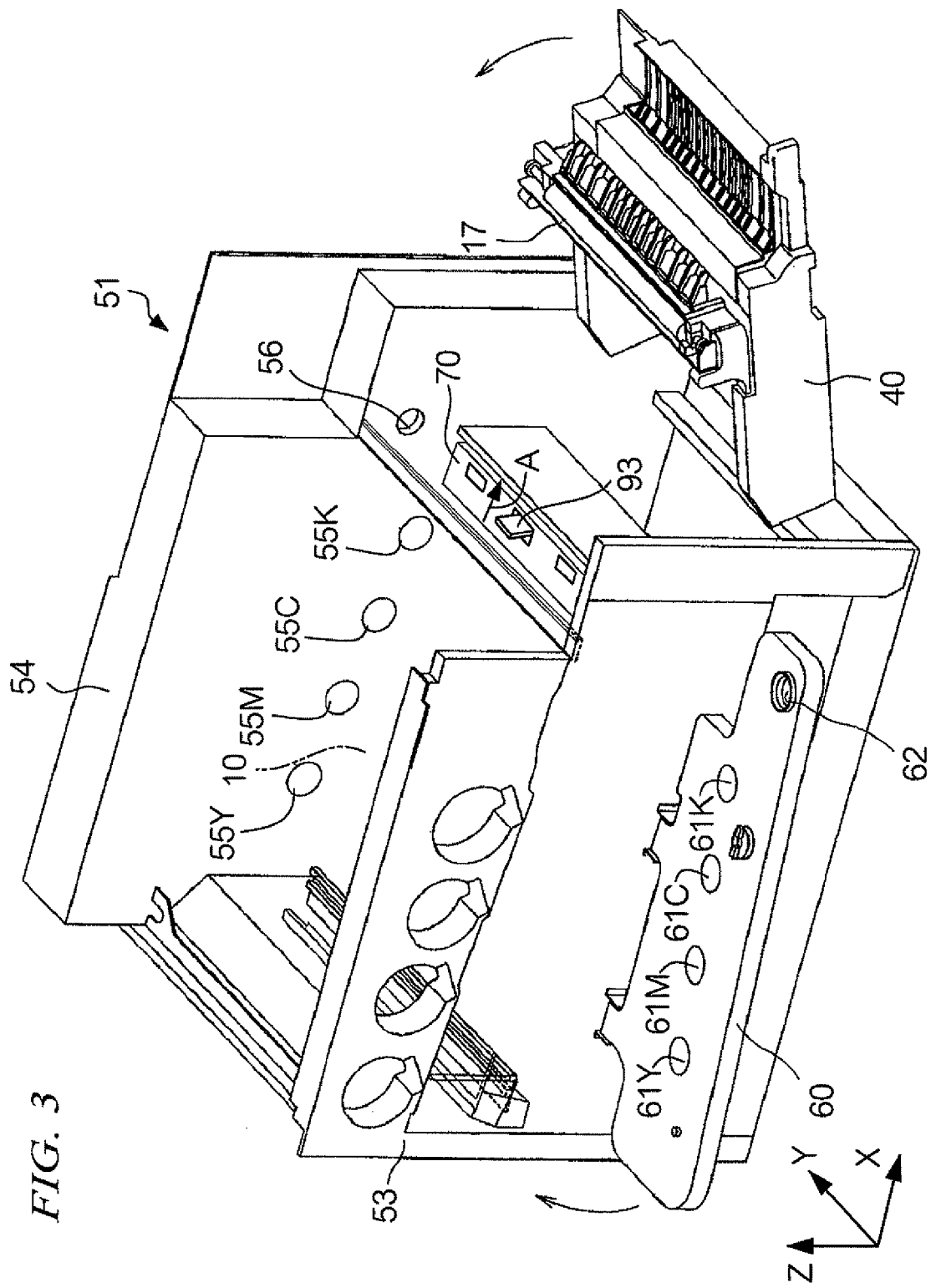
FIG. 3 shows a perspective view of the image-forming apparatus when an internal cover and a side cover are open.

Next, description is given for a structure of device body 51 forming an exterior of image-forming apparatus 1. FIG. 3 is a perspective view of image-forming apparatus 1 while an image-forming unit, an intermediate transfer unit, toner cartridges and other exterior parts are extracted from a device body.

As shown in FIG. 3, when exterior cover 52 located at the front of device body 51 is opened, front frame 53 is exposed. Toner cartridges 29Y, 29M, 29C, and 29K and intermediate transfer unit 9 are provided removably at front frame 53. Internal cover 60 serving as a door is provided openably at front frame 53. On the right side of device body 51, side cover 40 is provided openably. Inside side cover 40, secondary transfer roller 17 is provided. Secondary transfer roller 17 flexibly presses against drive roller 13 via intermediate transfer belt 10 while side cover 40 is closed. On the rear of device body 51, namely a position opposite to that of front frame 53, rear frame 54 is disposed. A space is provided between front frame 53 and rear frame 54. In this space intermediate transfer unit 9, image-forming unit 2, and toner cartridge 29 are disposed.

On the inside of internal cover 60, as shown in FIG. 3 four shaft supporters 61Y, 61M, 61C, and 61K, and roller supporter 62 are formed. Shaft supporters 61Y, 61M, 61C, and 61K support one side of each rotating shaft of photosensitive drums 3 of image-forming units 2Y, 2M, 2C, and 2K while internal cover 60 is closed. Roller supporter 62 supports one side of drive roller 13 of intermediate transfer unit 9 while internal cover 60 is closed.

On the inside of rear frame 54, four shaft supporters 55Y, 55M, 55C, and 55K, and roller supporter 56 are formed. Shaft supporters 55Y, 55M, 55C, and 55K support the other corresponding side of each rotating shaft of photosensitive drums 3. Roller supporter 56 supports the other corresponding side of drive roller 13 of intermediate transfer unit 9.

Here, a direction from the front (one side) of device body 51 to the back (the other side) opposite to the front (namely Y-axis) is a direction in which each of image-forming units 2Y, 2M, 2C, and 2K, toner cartridges 29Y, 29M, 29C, and 29K, and intermediate transfer unit 9 is inserted.

Each of image-forming unit 2, intermediate transfer unit 9, and toner cartridge 29 is extracted in a direction opposite to that of a direction of insertion while internal cover 60 is open; whereby these members are separated from device body 51.

Further, as shown in FIGS. 2 and 3 sensor device 70 is provided in device body 51. Sensor device 70 is disposed at a position (an example of a target measuring position) facing a downstream side of image-forming unit 2K on intermediate transfer belt 10 while intermediate transfer unit 9 is attached to device body 51.

Image-forming apparatus 1 measures a density of patch marks (an example of a toner image having a predetermined uniform density) formed at a predetermined position on intermediate transfer belt 10 and performs an operational processing, to feed back a charged voltage of photosensitive drum 3 or an exposure level for photosensitive drum 3 and set a toner density level within an allowable level. Sensor device 70 is used for measuring a density of the patch marks. Intermediate transfer belt 10 of intermediate transfer unit 9 is positioned facing aperture 81 of sensor device 70 (refer to FIG. 4). Intermediate transfer unit 9 can be removed when internal cover 60 is open. It is to be noted that in this exemplary embodiment, a configuration in which intermediate transfer unit 9 is separated from device body 51 is shown as an example; however a configuration may be envisaged also in which intermediate transfer unit 9 is extracted from and inserted into device body 51.

Configuration of Sensor

Figure 4:
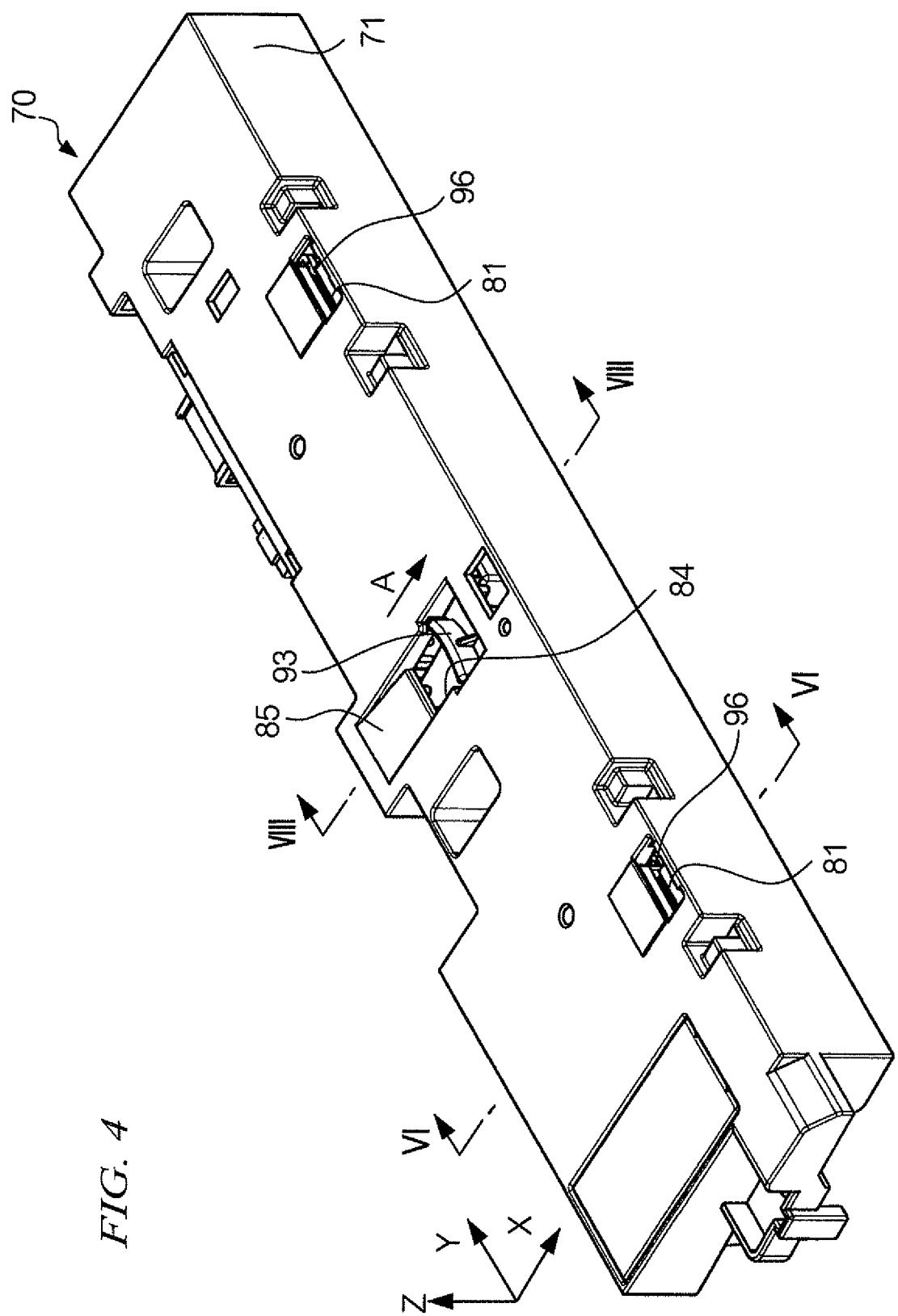
FIG. 4 shows a perspective view of a sensor device according to an exemplary embodiment.
Figure 5:
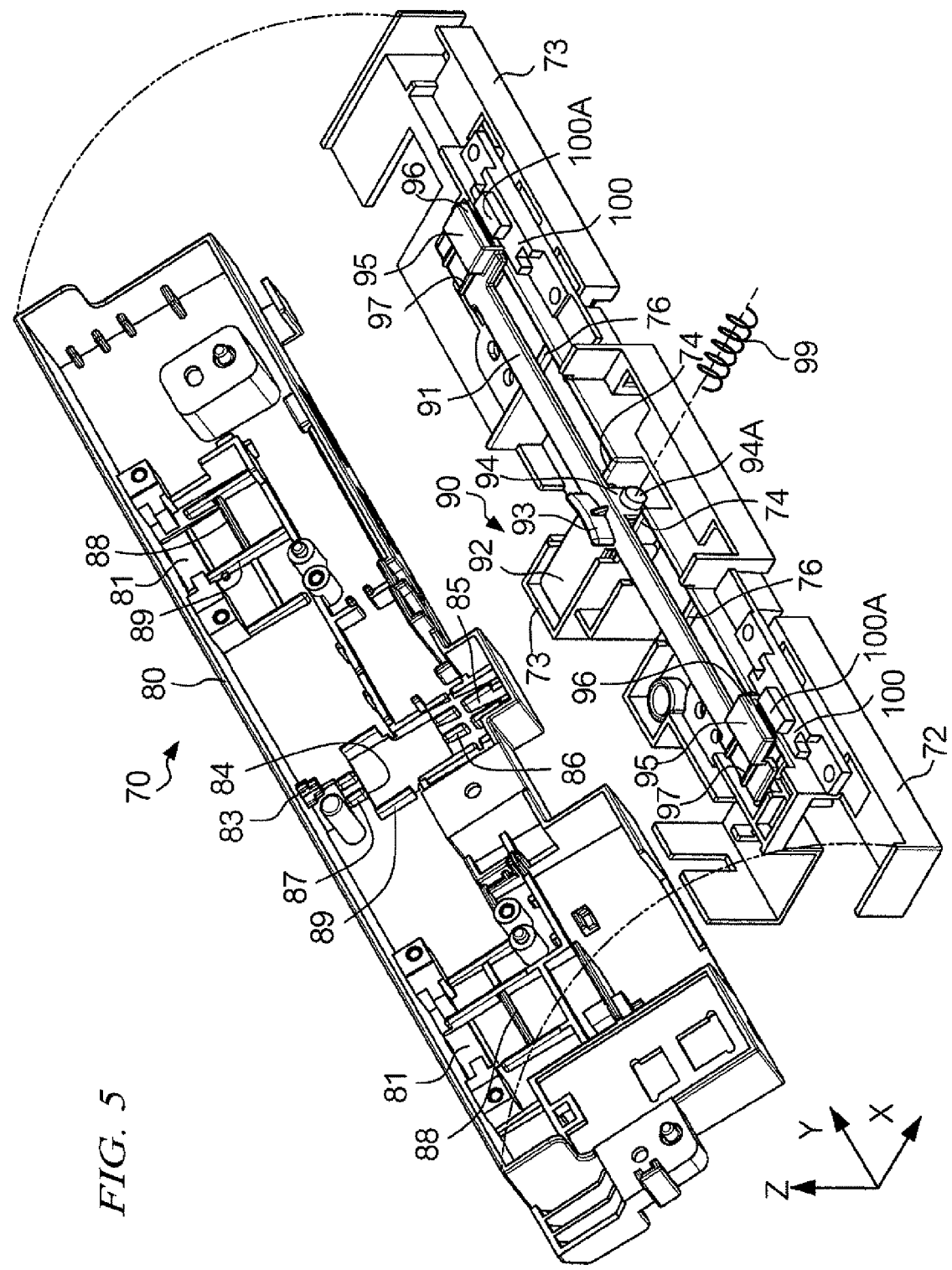
FIG. 5 shows an exploded perspective view of the sensor device when the sensor device is open.
Figure 6A:
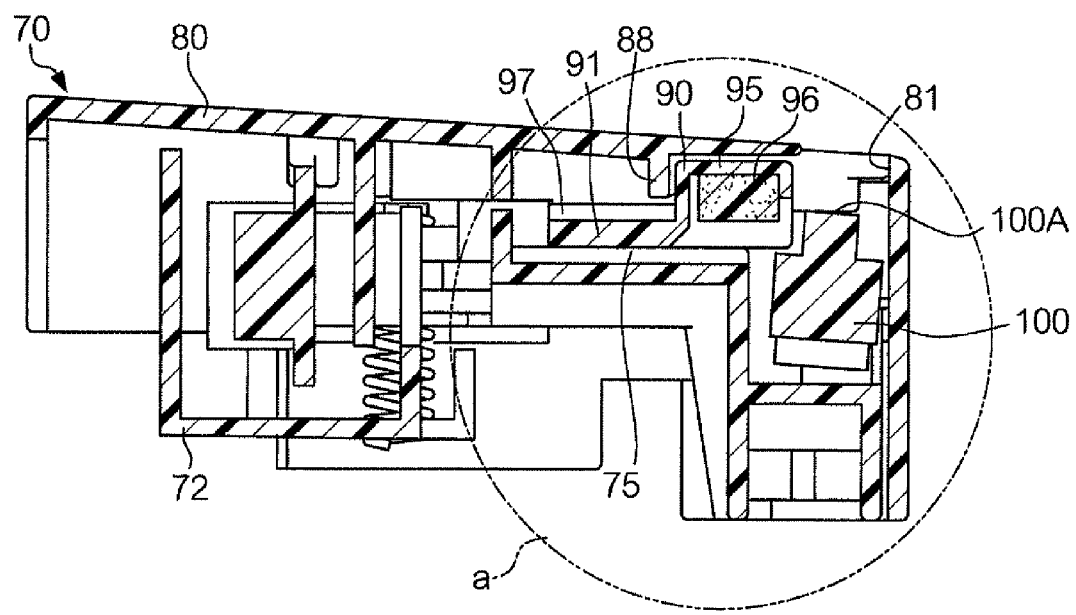
FIGS. 6A and 6B show cross-sectional views of the sensor device as viewed in a direction of arrow VI-VI of FIG. 4.
Figure 6B:
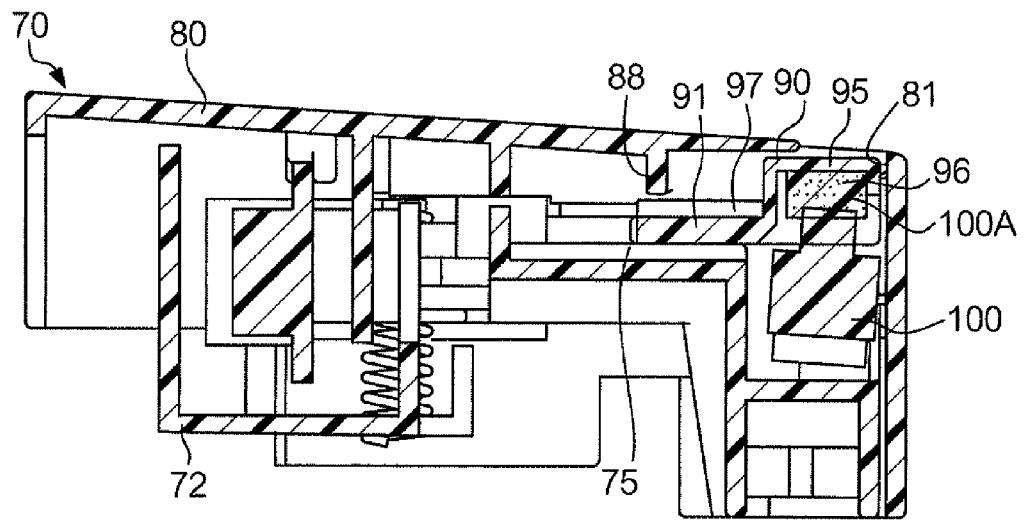
Figure 7:
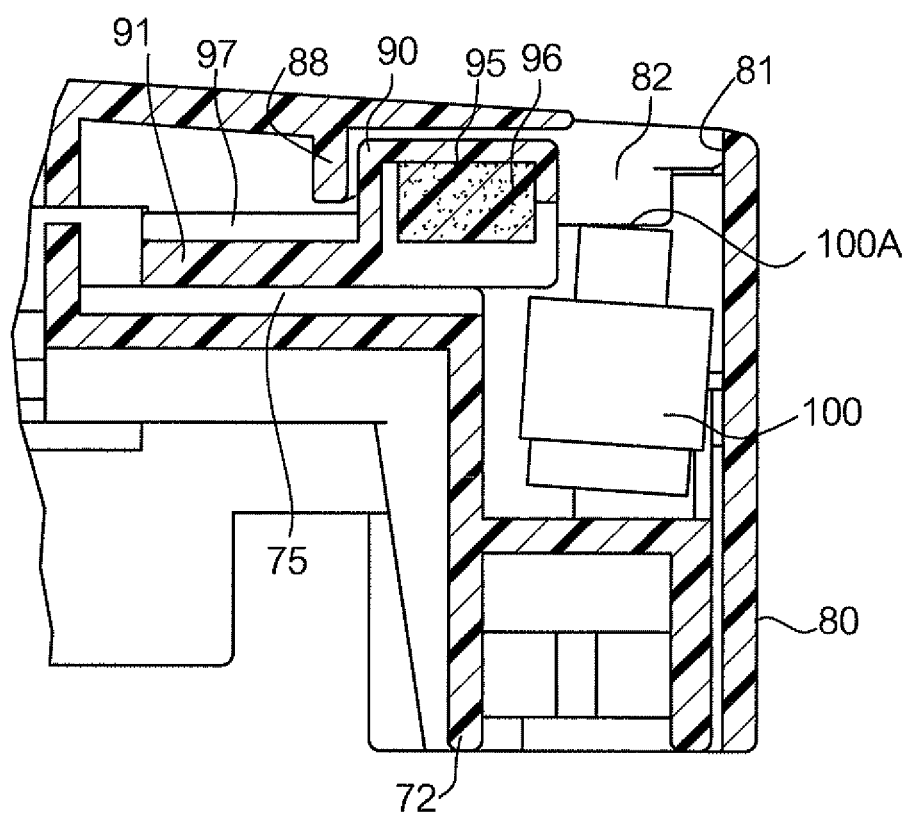
FIG. 7 shows an enlarged view of a part of FIG. 6A.
Figure 8A:
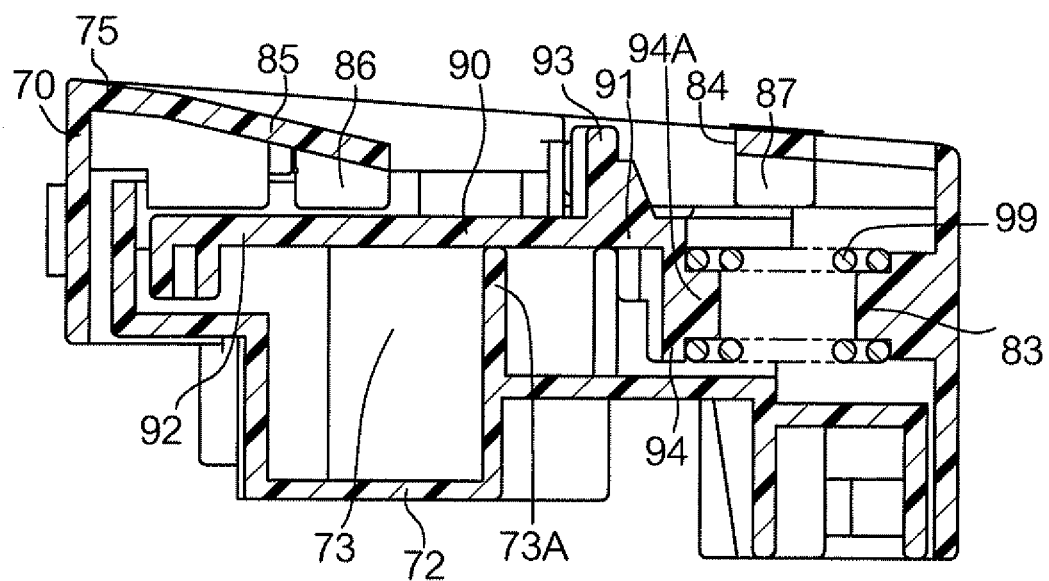
FIGS. 8A and 8B show cross-sectional views of the sensor device as viewed in a direction of arrow VIII-VIII of FIG. 4.
Figure 8B:
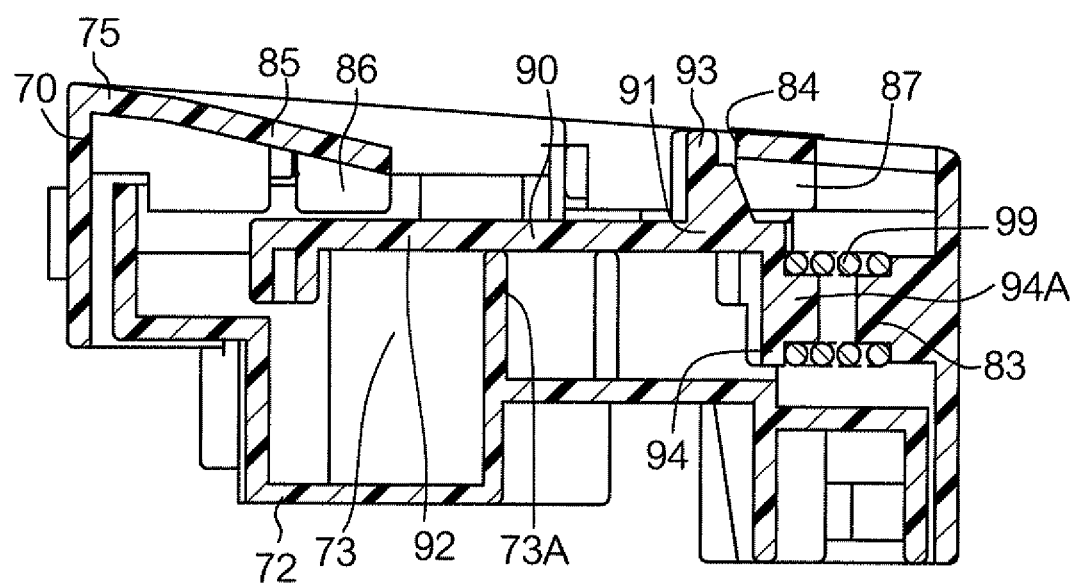

Next, description is given for a configuration of sensor device 70. FIG. 4 is a perspective view of sensor device 70. FIG. 5 is an exploded perspective view of sensor device 70 when sensor device 70 is open. FIGS. 6A and 6B are cross-sectional views of sensor device 70 as viewed in a direction of arrow VI-VI of FIG. 4. FIG. 7 is an enlarged view of a part of FIG. 6A. FIGS. 8A and 8B are cross-sectional views of sensor device 70 as viewed in a direction of arrow VIII-VIII of FIG. 4

Sensor device 70 has box-shaped case 71 serving as a member that is comprised of base portion 72 and cover portion 80. Inside case 71, moving member 90 reciprocating in X-axial direction is provided. X-axial direction is defined as a so-called sub scanning direction in image-forming apparatus 1; Y-axial direction is defined as a so-called main scanning direction in image-forming apparatus 1. In the following description, a positive direction of X-axis is referred to as a frontward direction, a negative direction of X-axis is referred to as a rearward direction, a right direction of Y-axis is referred to as a right direction, a left direction of Y-axis is referred to as a left direction, a positive direction of Z-axis is referred to as an upward direction, and a negative direction of Z-axis is referred to as a downward direction.

Moving member 90 has shank 91 extending to right and left in Y-axial direction. At the center of shank 91, main portion 92, manipulation portion 93, and spring bracket 94 are formed. Main portion 92 protrudes in a rearward direction. Manipulation portion 93 protrudes in an upward direction and has an arc-shaped surface when viewed in cross-section. Spring bracket 94 has both columnar spring supporter 94A protruding in the frontward direction and main portion 92. Coiled spring 99 serving as an applying portion is provided as a return spring between spring supporter 83 on cover portion 80 and spring supporter 94A. Coiled spring 99 applies to moving portion 90 a force toward one direction of a reciprocating movement (a return motion). Sub portion 95 is formed at each end of shank 91. Each of sub portions 95 extends in the frontward direction and protrudes in the upward direction. On the undersurface of sub portion 95, cleaning unit 96 is provided. Cleaning unit 96 is formed of a flexible material such as sponge, cloth, and so on. Sub portion rib 97 is formed on shank 91 at a position corresponding to each of sub portions 95. Each of sub portion ribs 97 extends in the front/rear direction (X-axial direction) and protrudes toward the upward direction. Manipulation portion 93 is formed on a line that is orthogonal to a straight line between cleaning units 96, and passes through the middle point of the straight line. Manipulation portion 93 is a support tool used for an operator to move moving member 90 against a force applied from coiled spring 99 in a direction opposite to that of the force applied, in other words in a direction other than that of the direction of movement (a return motion).

Main portion holder 73 serving as a restricting portion is formed on base portion 72. Main portion holder 73 holds main portion 92 of moving member 90 movable in the front/rear direction (X-axial direction) and restricts a direction of movement in which main portion 92 (moving member 90) reciprocates. On sidewall 73A located at the front among sidewalls forming main portion holder 73, a concave portion (not shown) to which main portion 92 is fitted.

As shown in FIG. 5, first base portion ribs 74 extending in each of a frontward and rearward direction are formed on base portion 72 at positions facing main portion 92. As shown in FIGS. 6A, 6B and FIG. 7, second base portion ribs 75 extending in the front/rear directions are formed at positions corresponding to sub portions 95 of shank 91. Plural third base portion ribs 76 (refer to FIG. 5 and FIG. 7) extending in the front/rear directions are formed at positions corresponding to shank 91. Shank 91 is mounted on the third base portion ribs 76.

Two rectangle-shaped apertures 81 are formed on cover portion 80 such that one aperture 81 is spaced apart from another aperture 81 in a cross direction. As shown in FIG. 7, sensors 100 are provided such that sensor surfaces 100A face the outside across spaces 82. In this exemplary embodiment, each sensor 100 is fixed to cover portion 80 by fixing a base of the sensor 100 to cover portion 80 by a screw (not shown). Sensor 100 measures a physical quantity of a developer density by way of sensor surface 100A facing the outside.

Cross-shaped spring supporter 83 supporting coiled spring 99 is formed on cover portion 80 at a position facing spring supporter 94A while cover portion 80 is fitted to base portion 72. Penetrating hole 84 is formed at a position corresponding to spring supporter 83. Manipulation portion 93 protrudes to the outside through penetrating hole 84. Pressure plates 85 are formed at the back of penetrating hole 84. Each of pressure plate 85 extends in the frontward direction and is inclined toward the downward direction. Pressure ribs 86 extending in the front/rear directions are formed at the lower part of pressure plates 85. Each end of pressure rib 86 is inclined towards inclination of pressure plate 85 so as to contact the surface of main portion 92.

First cover portion ribs 87 protruding in the front/rear directions are formed on cover portion 80 at a position corresponding to the front of each aperture 81 and faces main portion 92. Second cover portion ribs 88 extending in the left/right directions are formed on cover portion 80 at positions corresponding to sub portions 95 of shank 91 (refer to FIG. 5 and FIG. 7). Further, third cover portion ribs 89 extending in the front/rear directions are formed on cover portion 80 at positions corresponding to shank 91 extending from main portion 92 to each of sub portions 95 (refer to FIG. 5).

Cleaning of Sensor Device

Sensor device 70 with the configuration described above is formed by assembling base portion 72 and cover portion 80 while coiled spring 99 and moving member 90 are positioned between base portion 72 and cover portion 80.

Main portion 92 of moving member 90 is inserted in main portion holder 73 as shown in FIG. 5; thereby moving member 90 is restricted so as not to move in the left/right directions, and is able to move only in the front/rear directions. In addition, as shown in FIG. 8A the under surface of main portion 92 contacts the surface of wall 73A, and the upper surface of main portion 92 faces pressure ribs 86. In each part of sub portions 95, as shown in FIGS. 6A, 6B and FIG. 7 the under surface of shank 91 contacts second base portion rib 75, and the upper surface of shank 91 faces second cover portion rib 88 via sub portion rib 97. Further, in a part of shank 91, as shown in FIG. 5 the under surface of shank 91 contacts third base portion ribs 76, and the upper surface of shank 91 faces third cover portion ribs 89. These ribs 76 and 89 serve as maintaining portions for maintaining a state in which cleaning unit 96 contacts sensor surface 100A. Each rib decreases friction that occurs when moving member 90 moves by using a part where moving member 90 and case 71 are in contact at a contact point or a contact line.

Next, description is given for a cleaning operation. Sensor device 70 allows cleaning operation to take place by an operator.

To inform a timing of cleaning, image-forming apparatus 1 may store a procedure of information processing, and output information when a condition such as a number of mediums, and an operating time exceeds a predetermined threshold. Upon access of this information by an operator the operator performs a cleaning operation.

Firstly, the operator opens exterior cover 52, internal cover 60, and side cover 40 as shown in FIG. 1 and FIG. 3, and extracts intermediate transfer unit 9 from the image-forming apparatus 1. The reason that side cover 40 is opened when intermediate transfer unit 9 is extracted is that secondary transfer roller 17 provided on side cover 40 presses against intermediate transfer belt 10 (drive roller 13).

When sensor device 70 is shown as shown in FIG. 3, the operator pulls manipulation portion 93 in a direction of arrow A.

At this time, in sensor device 70 manipulation portion 93 is moved in a direction of arrow. A as shown in FIG. 4; in a part of main portion 92 moving member 90 moves in the right direction as shown in FIG. 8B; coiled spring 99 is compressed in correspondence to an amount of this movement; and a repulsion force in the opposite direction occurs. Sub portion 95 (cleaning unit 96) contacts sensor surface 100A of sensor 100 as a movement of moving member 90 in the right direction, and comes into space 82 scribing sensor surface 100A.

At this time, dust or the like accumulated on sensor surface 100A is removed by cleaning unit 96 moving the surface of sensor surface 100A scribing there, and sensor surface 100A is cleaned. When the operator releases control of manipulation portion 93, manipulation portion 93 is caused to move in a direction opposite to in which operator applies a force against a force applied by coiled spring 99. In other words, moving member 90 returns an original position due to a repellent force of coiled spring 99. This operation is repeated several times (for example, 5 times), until cleaning of sensor surface 100A is complete.

This operation is performed in a situation according to a structure of image-forming apparatus 1 as shown in FIG. 3, which is well visible, thus preventing mistakes that an inexperienced operator would make when performing a cleaning operation in operating sensor device 70. In addition, an operator can view a condition of contamination, so that excessive cleaning of sensor surface 100A, which is not contaminated by a toner, paper powder, dust, or the like, is not carried out; thereby preventing damage to sensor surface 100A.

2. Modification

The present invention is not limited to the above exemplary embodiment, but it may be practiced as described in the following modifications.

In the exemplary embodiment, sensor device 70 providing a function for cleaning the sensor surface of each of two sensors 100 is shown as an example. However, the present invention is not limited to this configuration. The present invention may be applied to a sensor device having one sensor 100 or three or more sensors 100. In this case, a sensor surface is also cleaned by a movement of a manipulation portion in one direction of a reciprocating motion if a manipulation portion is formed at the centroid of a shape connecting the cleaning units.

In the exemplary embodiment, sensor device 70 applied to image-forming apparatus 1 is shown as an example. However the present invention is not limited to this aspect. The present invention may be applied to another apparatus.

In the exemplary embodiment, it is described that sensor 100 is an element for measuring a toner density. However the present invention is not limited to this configuration. For example, sensor 100 may be a photo detective element such as an element for measuring luminance. Indeed the only requirement is that a sensor measures a physical quantity of a target by way of a sensor surface.

Further, in the exemplary embodiment, aperture 81 formed in a rectangle shape is shown as an example. However an aperture may be formed by forming a U-shaped cutout on a cover portion and cutting a free end of a tongue-shaped portion, or by overlapping plural board members such that an aperture is formed.

Moreover, in the exemplary embodiment, it is described that aperture 81 is formed on box-shaped case 71. However, a case is not limited to be formed in a box shape. An aperture, a sensor, and a moving member may be only provided on a cover portion.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiments have been chosen and described so that the principles of the invention and its practical applications are best explained, thereby enabling others skilled in the art to understand the invention for use with various embodiments and with various modifications as suited to a particular use contemplated. It is intended that the scope of the invention be defined by the following claims and their equivalents.

What is claimed is:

1. A sensor device comprising:
a member that has an aperture facing a target measuring position through which a target to be measured passes;

a sensor that is provided in an opposing relation to the target measuring position, and that measures a physical quantity of the target at a sensor surface facing the aperture; and a moving member that reciprocates a movement in a predetermined direction, and includes:

a cleaning unit that cleans the sensor surface by contacting the sensor surface while the moving member moves to at least one of an outward movement and a return reciprocal movement;

an applying portion that applies to the moving member a force in one direction of the reciprocation movement; and a manipulation portion that is moved by an operator against the force applied by the applying portion in an direction opposite to that of a direction of the force.

2. The sensor device according to claim 1, wherein:

the member has a plurality of apertures;

a separate sensor is provided for each of the plurality of apertures;

the cleaning unit is located at a position corresponding to each sensor; and the manipulation portion is located on a line that is orthogonal to a line connecting each cleaning unit and passes through a midpoint of the line.

3. The sensor device according to claim 1, further comprising a maintaining portion that maintains a state in which the cleaning unit and the sensor surface are in contact with each other.

4. The sensor device according to claim 2, further comprising a maintaining portion that maintains a state in which the cleaning unit and the sensor surface are in contact with each other.

5. The sensor device according to claim 1, further comprising a restricting portion that restricts a direction of movement in which the moving member reciprocates.

6. The sensor device according to claim 2, further comprising a restricting portion that restricts a direction of movement in which the moving member reciprocates.

7. The sensor device according to claim 3, further comprising a restricting portion that restricts a direction of movement in which the moving member reciprocates.

8. An image-forming apparatus comprising:

an image-forming unit that forms an image; and a sensor device that measures a density of the image formed by the image-forming unit, and includes:

a member that has an aperture facing a target measuring position through which a target to be measured passes;

a sensor that is provided in an opposing relation to the target measuring position, and that measures a physical quantity of the target at a sensor surface facing the aperture; and a moving member that reciprocates a movement in a predetermined direction, and includes:

a cleaning unit that cleans the sensor surface by contacting the sensor surface while the moving member moves to at least one of an outward movement and a return reciprocal movement;

an applying portion that applies to the moving member a force in one direction of the reciprocation movement; and a manipulation portion that is moved by an operator against the force applied by the applying portion in an direction opposite to that of a direction of the force.

9. The image-forming apparatus according to claim 8, further comprising a member that forms at least a part of the image-forming unit, is movable from the position facing the aperture, and causes the target to pass to a position facing the aperture, wherein the manipulation portion is operated through a space resulting from the movement of the member.

10. The image-forming apparatus according to claim 9, wherein a direction of movement of the moving member includes a direction in which a recording medium is transported inside the image-forming apparatus.

* * * * *